United States Patent [19]

Ricci

[11] Patent Number: 5,549,024

[45] Date of Patent: Aug. 27, 1996

[54] CLAMSHELL PIPE LATHE HAVING IMPROVED BEARING ARRANGEMENT

[76] Inventor: Donato L. Ricci, W8477 - 162nd Ave., Hager, Wis. 54014

[21] Appl. No.: 380,105

[22] Filed: Jan. 30, 1995

[51] Int. Cl.⁶ ............................. B23B 3/22; B23Q 1/40
[52] U.S. Cl. ................................ 82/113; 82/101
[58] Field of Search ...................... 82/101, 113; 30/96, 30/97; 384/58

[56] References Cited

U.S. PATENT DOCUMENTS

| 3,661,431 | 5/1972 | Wisecarver | 384/58 |
| 4,739,685 | 4/1988 | Ricci . | |
| 4,939,964 | 7/1990 | Ricci | 82/113 |

*Primary Examiner*—M. Rachuba
*Assistant Examiner*—Kenneth J. Hansen
*Attorney, Agent, or Firm*—Haugen and Nikolai, P.A.

[57] ABSTRACT

A clamshell machining lathe for cutting and finishing pipes in industrial settings comprises a split-ring assembly, including a clamping ring that is positioned about the pipe, and journaled to the clamping ring is a rotatable gear ring that supports a tool block carrying a cutting tool. The improvement resides in the bearing arrangement used to journal the gear ring to the stationary clamping ring. One face of the gear ring includes an annular groove whose side walls define a bearing race. The race is dimensioned to receive a plurality of roller bearings therein, the roller bearings being affixed to a planar surface of the clamping gear in a circumferential arrangement so as to fit into the bearing race when the gear ring is coupled to the clamping ring. The arrangement can support greater loads without canting, thus reducing wear on the moving parts.

10 Claims, 5 Drawing Sheets

5,549,024

CLAMSHELL PIPE LATHE HAVING IMPROVED BEARING ARRANGEMENT

BACKGROUND OF THE INVENTION

I. Field of the Invention

This invention relates generally to a machining lathe, and more particularly to a split frame clamshell-type portable machining lathe for cutting and finishing relatively large diameter pipes.

II. Description of the Prior Art

Split frame clamshell lathes of the type described herein are known in the art. My earlier U.S. Pat. Nos. 4,739,685 and 4,939,964 are illustrative of the technology involved. The split frame pipe machining lathe generally comprises first and second semicircular halves that are designed to be joined together so as to surround the pipe to be machined. The resulting annular assembly includes a stationary ring portion that becomes clamped to the pipe and an abutting rotatable portion including a ring gear that is journaled to the stationary portion for rotation about the concentrically disposed pipe. An air-operated, hydraulically-operated or electrically-operated motor is operatively coupled to the assembly and includes a drive gear designed to mesh with the ring gear on the rotatable segment of the pipe lathe. Also mounted on the rotatable segment of the pipe lathe is a tool block for supporting a cutting tool that can be made to advance in the radial direction against the pipe to be machined in incremental steps upon each revolution of the ring gear.

A problem has heretofore existed in the prior art in the manner in which the ring gear has been journaled to rotate relative to the stationary clamping ring. It FIG. 2 of my earlier U.S. Pat. No. 4,739,685, which is reproduced herein as FIG. 1, there is shown a cross-section illustrating the manner in which the gear member 10 is journaled for rotation relative to the stationary ring member 11. A first set of roller bearings 12 cooperate with the straight arcuate surface of a circular race member 14, which is bolted onto the ring gear member 10 by bolts 13. The race member 14 also cooperates with a second set of bearings 15. The bearings in set 15 have opposed beveled segments for cooperating with a W-shaped surface 16 formed on the race member 14 and with a V-shaped extension or protuberance 17 formed on the inner side wall of the cavity 18.

It has been found that under load, the race member 14 behaves like a fulcrum, allowing the ring gear 10 to rock back and forth which results in undue wear on the bearings and slight variation in the cutting circle as the ring gear orbits the pipe being finished. Moreover, the assembly is costly to manufacture because of the intricacies in the machining required to produce the ring gear 10 and the tolerances that need to be maintained between the ring gear 10 and the circular race member 14 so that these parts will provide the appropriate contact with the associated bearings 12 and 15.

In the low clearance pipe lathe described in my earlier U.S. Pat. No. 4,939,964, the problems inherent in the journaling of the ring gear to the stationary member described in the '685 patent were partially resolved. FIG. 2 herein taken from the '964 patent shows the way the ring gear is journaled in that earlier invention. The problem of undue wear occasioned by the ability of the ring gear 19 therein to rock under loads was still present. Again, the race member 20 was fabricated separately from the ring gear 19 and affixed to it by bolts which made it difficult to maintain the desired degree of contact between the race member 20, the W-shaped segment 21 on the ring gear and the notched roller bearings 22 affixed to the stationary member 23.

OBJECTS

It is accordingly a principal object of the present invention to provide an improved split frame clamshell pipe lathe.

Another object of the invention is to provide a portable, clamshell-type pipe lathe having an improved bearing/bearing race design that resists rocking under load.

A further object of the invention is to provide an improved bearing structure for a portable pipe machining lathe of the clamshell type whose rotatable ring gear includes a simplified one-piece bearing race milled into the flat side surface of the ring gear and cooperating with roller bearings that are eccentrically mounted on an axis whereby the clearance between the bearing surface and its associated race can be adjusted to a desired tolerance to thereby inhibit any tendency of the ring gear to rock relative to the stationary ring member even under heavy loads.

A still further object of the invention is to provide an improved portable clamshell-type pipe machining lathe including a rotatable ring gear having a bearing race machined therein and whose side surfaces define a bearing race that cooperates with first and second sets of roller bearings that are slightly radially offset from one another to thereby increase the span and spread the load, thereby minimizing any undue wear during use.

SUMMARY OF THE INVENTION

The foregoing objects and features of the invention are achieved by providing a clamshell machining lathe for cutting or finishing pipes used in industrial applications where the machining lathe comprises a first stationary annular member that is adapted to be concentrically clamped about the periphery of a cylindrical pipe segment to be finished. This first stationary annular member has an inner arcuate face, an outer arcuate face and a planar surface extending therebetween. A plurality of sets of roller bearings having plural rollers rotatably mounted on a common axes are designed to have a predetermined outer diameter. The members of the set are affixed to the stationary annular member with the axes thereof disposed perpendicularly to a planar surface of the first annular member to define a generally circular track. Completing the assembly is a second, rotatable, annular member having an inner arcuate face, an outer arcuate face and a planar surface extending therebetween. The outer arcuate face includes gear teeth thereon. The planar surface of the second annular member includes a circumferential bearing race comprising a groove of a depth and width to receive therein the plurality of roller bearings when the first and second annular members are juxtaposed with the planar surface of the first annular member in facing relationship to the planar surface of the second annular member. The outer diameter of the plurality of roller bearings cooperate with the opposed walls defining the circumferential bearing race to rotatably support the second annular member relative to the first annular member.

In accordance with one embodiment, the plurality of roller bearings are arranged in first and second sets with the roller bearings in the first set each rotatable about an axis that is radially offset relative to a corresponding axis of the second set. In a second embodiment, the axes of each of the roller bearings lies on the same bearing circle of the stationary member but are eccentrically mounted on their axes of rotation so as to be adjustable in establishing rolling contact between them and their associated race surfaces.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 3:
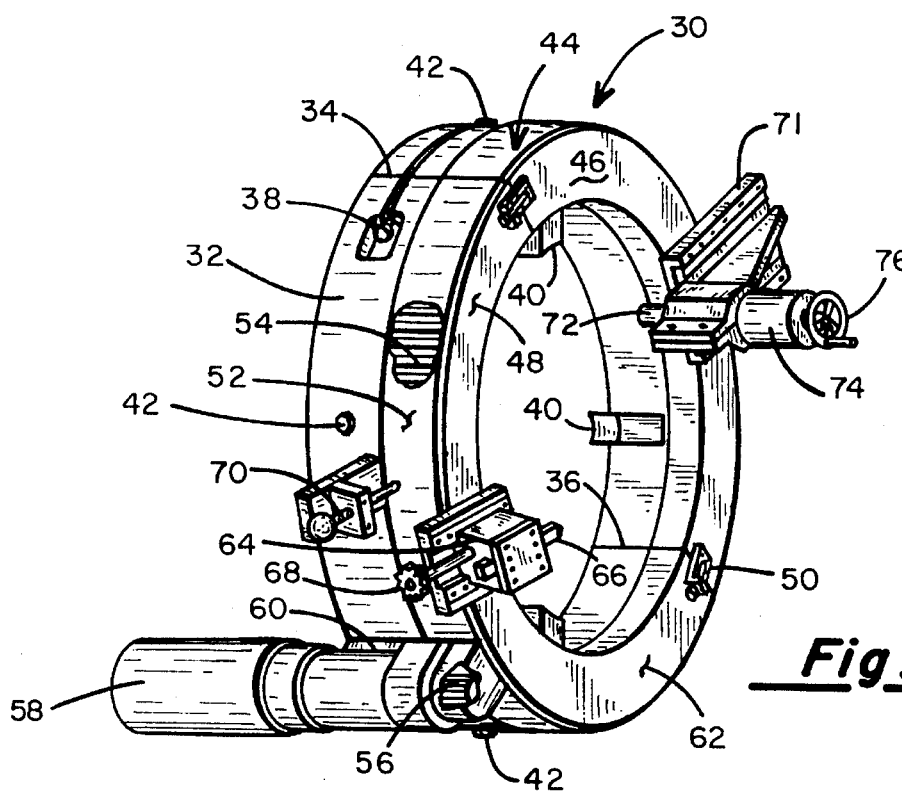
FIG. 3 is a perspective view of a pipe lathe constructed in accordance with the present invention.

Referring to FIG. 3, there is shown a perspective view of clamshell-type pipe lathe constructed in accordance with the present invention. It is indicated generally by numeral 30 and is seen to comprise a first annular member 32 that is adapted to be concentrically clamped about the periphery of a cylindrical pipe to be finished (not shown). The annular member 32 is shown as being split diametrically along lines 34 and 36, with the two semicircular segments being fastened together by swing bolts as at 38. While the assembly 30 is shown as being comprised of two semicircular halves, to increase its portability, the device can be constructed as four quarter segments that may be joined together about the pipe. For proper centering, a plurality of pads 40 are positioned about the interior wall surface of the stationary ring member 32 and held in place by bolts 42 (FIG. 4).

Rotatably journaled to the interior face of the stationary ring member 32 is a second, rotatable, annular member 44 also comprised of two semicircular halves 46 and 48 held together by swing bolts as at 50. Enclosed within a protective shroud 52 attached to the stationary annular member is a ring gear 54 having a pattern of gear teeth formed in the outer peripheral surface thereof. As will be explained in greater detail hereinbelow, the ring gear 54 is journaled to the stationary annular member 32 and cooperates with a spur gear 56 which is driven by a suitable motor 58, the motor being mounted on a bracket 60 secured to the stationary annular member 32. The spur gear 56 meshes with the teeth on the ring gear 54 and when the motor 58 is driven, the ring gear 54 rotates within the shroud 52. The motor used may be air driven, hydraulically driven or electrically driven.

Affixed to the exterior face 62 of the ring gear 54 is a tool slide block assembly indicated generally by numeral 64. The tool slide block 64 supports a metal cutting tool 66 therein and upon each rotation of the gear ring, as the cutting tool orbits the pipe being finished, a star wheel 68 on the slide block assembly engages a pin 70 disposed in the path of travel of the star wheel, causing the threaded shaft to which the star wheel is affixed to rotate through a predetermined angle and thereby advance the slide block 64 in the radial direction. In this fashion, the tool 66 can be advanced in incremental steps through the wall thickness of the pipe being finished to cut off an end segment thereof.

Figure 4:
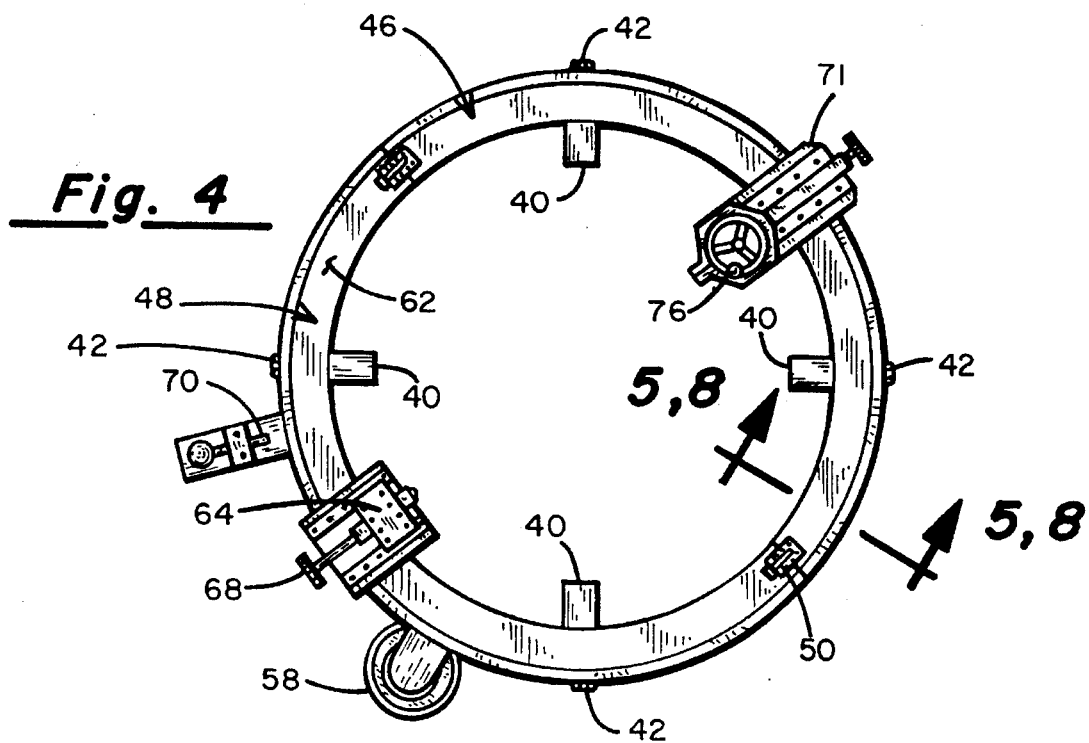
FIG. 4 is a side elevation of the embodiment of FIG. 3.

Also shown in FIGS. 3 and 4 is a bracket 71 attached to the exposed side face surface of the ring gear 54. Bracket 71 supports an end finishing tool 72 mounted in a threaded arbor 74 and adjustable in the longitudinal direction by rotation of a crank wheel 76. The crank wheel 76 is shown as being manually operated to advance the tool 72 against a cut end surface of a pipe, but those skilled in the art can appreciate that the tool can also be advanced using a step-motor drive, if desired.

Figure 5:
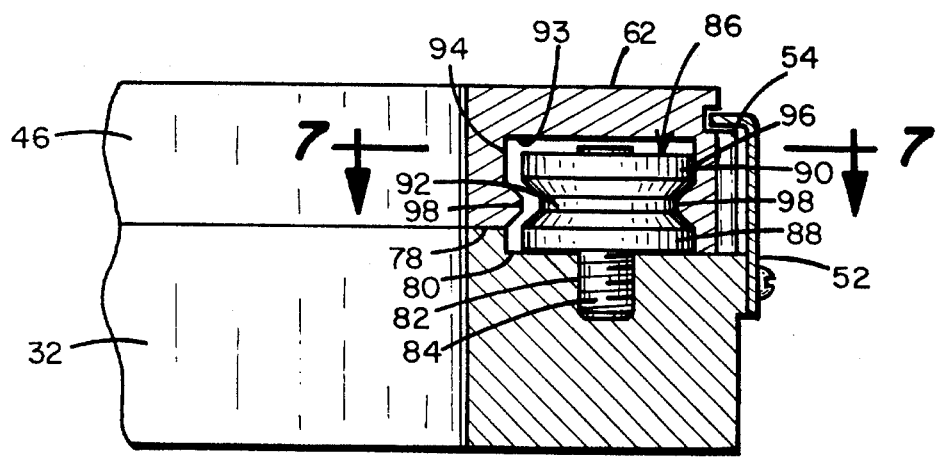
FIG. 5 is a partial cross-sectional view taken along the line 5—5 in FIG. 4.
Figure 6:
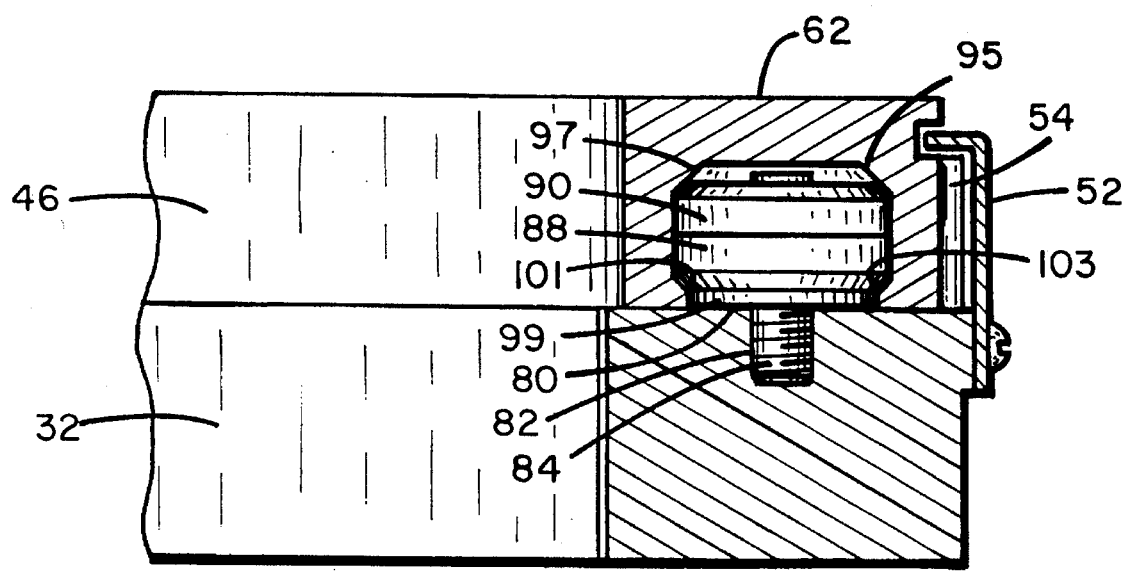
FIG. 6 is a partial cross-sectional view taken along the line 5—5 in FIG. 4, but with an alternative roller bearing configuration.

Turning next to FIGS. 5 and 6, a first embodiment of the invention will be explained, showing the improved manner in which the ring gear assembly 54 is journaled for rotation relative to the stationary annular member 32. The stationary member 32 and the rotatable annular gear ring member 54 abut one another along a line 78 which are machined flat. An annular recess 80 of a predetermined depth dimension is also machined into the stationary member 32 and formed inwardly therefrom are a series of threaded bores as at 82 which are adapted to receive a threaded spindle or axle 84 of a roller bearing assembly 86. The bearing assembly itself comprises upper and lower ball bearing mounted rollers 88 and 90 separated from one another by a washer-type spacer 92. The outer race of the roller bearings 88 and 90 are inwardly beveled to form a V-shaped notch, as shown, when the two roller bearings 88 and 90 are juxtaposed on the threaded axle 84.

Formed inwardly from the interior face of the ring gear 62 is an annular groove 93, having a pair of opposed side walls 94 and 96. Each of the walls 94 and 96 is provided with an annular protuberance 98, which has a cross-sectional appearance of a truncated isosceles triangle, and, as such, conforms to the shape of the V-notch 92 formed in the roller bearing assemblies 86.

FIG. 6 illustrates an alternative roller bearing configuration from that shown in FIG. 5. Instead of positioning the individual roller bearings 88 and 90 with their beveled ends facing one another as in FIG. 5, in the arrangement of FIG. 6, the roller bearings are inverted such that the beveled ends thereof are directed away from one another and the spacer washer 99 is relocated to be adjacent the surface 80 of the housing 32. By configuring the roller bearings 88 and 90 as indicated in FIG. 6, it obviates the need for a somewhat difficult-to-form, projecting, annular ridge as at 98 in FIG. 5. Instead, the gear 62 has angled corner edges as at 95, 97, 101 and 103 in FIG. 6. Thus the bearing race formed in the gear 62 is made to conform closely to the outer profile of the roller bearings 88 and 90.

Figure 7:
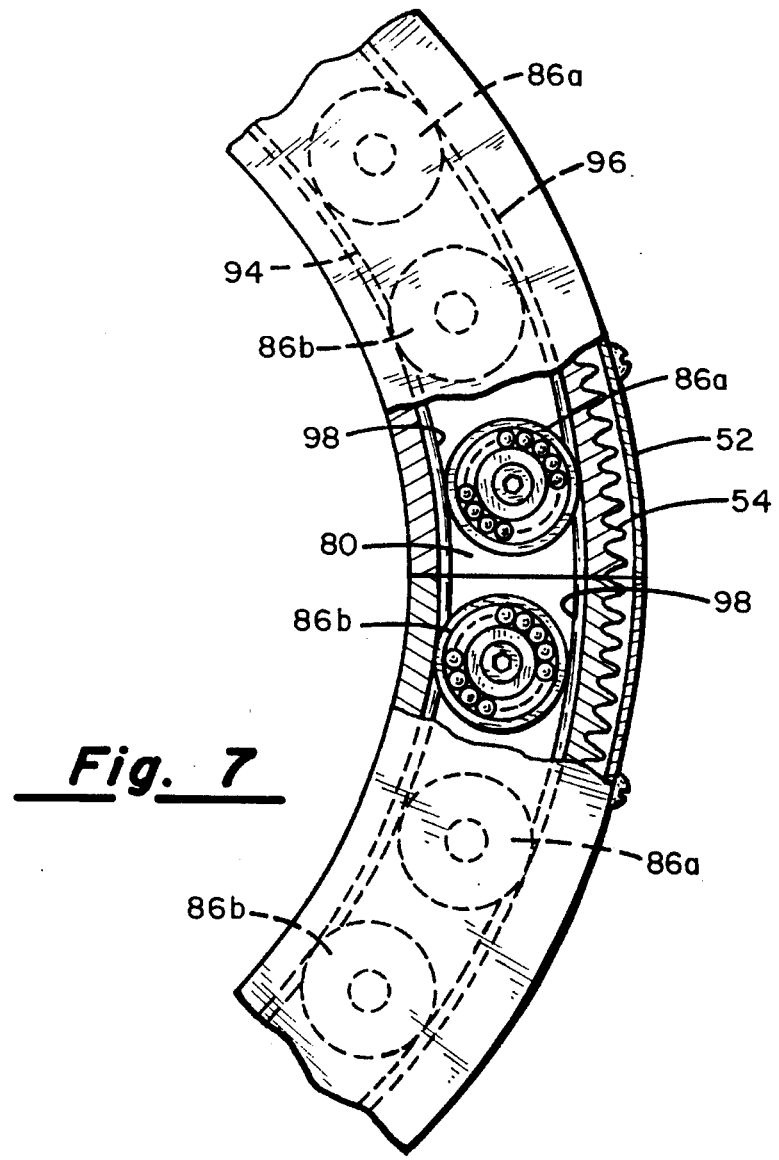
FIG. 7 is a cross-sectional view taken along the line 7—7 in FIG. 5.

With reference to the cross-sectional view of FIG. 7, it can be seen that the roller bearing assemblies 86 do not lie on a common bearing circle, but instead, have their rotational axles 84 radially offset. That is to say, a first set of roller bearings labeled 86a lie on a first bearing circle, such that the peripheries thereof engage the wall 96 of the bearing race 93 while the roller bearings labeled 86b fall on a bearing circle radially displaced from the bearing circle in set 86a whereby their peripheral surfaces engage the bearing race wall 94. The roller bearings of the set labeled 86a alternate with those in the set labeled 86b around the circumference of the annular member 32.

Figure 1:
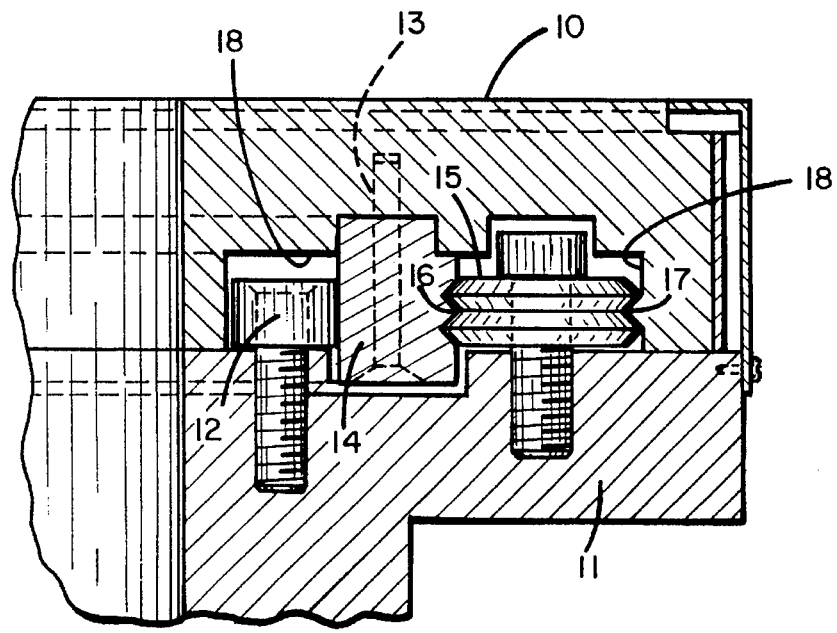
FIG. 1 illustrates a first prior art structure for journaling a ring gear to a stationary ring member in a clamshell-type pipe machining lathe.
Figure 2:
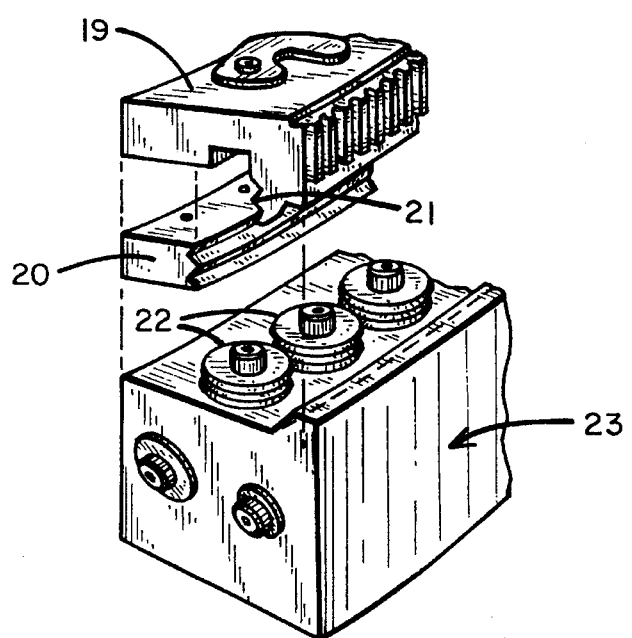
FIG. 2 depicts another prior art structure for journaling the ring gear of a portable clamshell-type pipe machining lathe to its associated stationary ring member.

It has been found that the staggered arrangement of the roller bearings and their cooperation with the walls on the bearing race 93 prevents any lateral shifting of the rotatable ring member 54 relative to the stationary ring member 32, even when subjected to relatively high loads as the ring gear and attached tool assemblies are driven to orbit the pipe being finished. Also, the construction of the assembly is greatly simplified in that it does not require a separate race member bolted to the ring gear as in the prior art arrangements of FIGS. 1 and 2.

ALTERNATIVE EMBODIMENT

Figure 8:
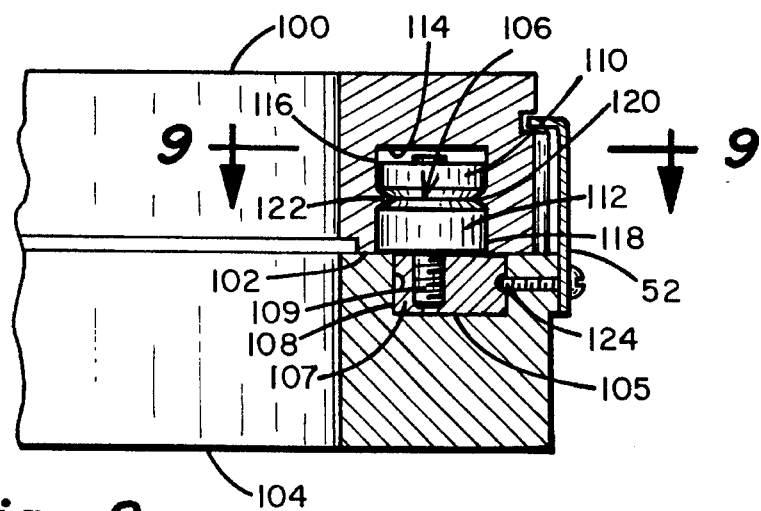
FIG. 8 is a cross-sectional view of an alternative embodiment taken along the line 8—8 in FIG. 4.
Figure 9:
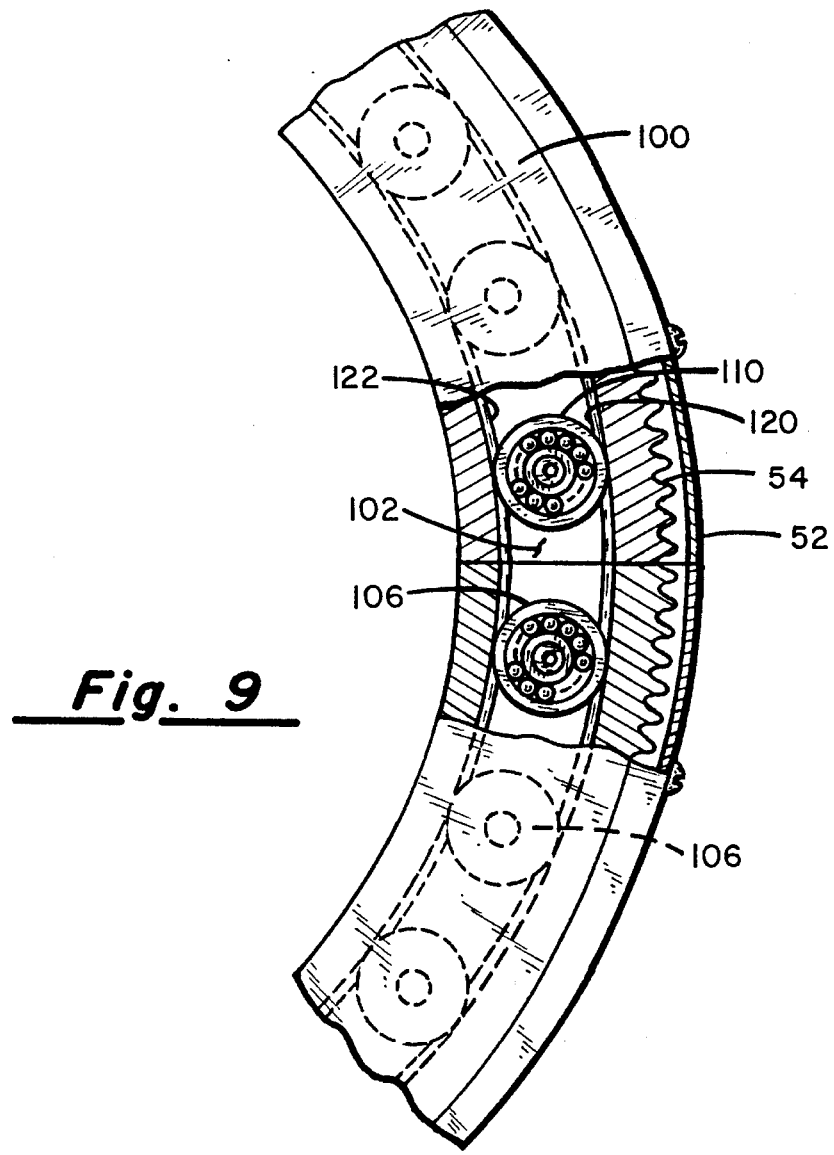
FIG. 9 is a cross-sectional view taken along the line 9—9 in FIG. 8.

Referring next to FIGS. 8 and 9, an alternative embodiment is illustrated. In this arrangement, there is again a ring gear member 100 journaled for rotation on an interior planar surface 102 of a stationary annular member 104. More particularly, the stationary annular member 104 has its surface 102 provided with regularly, circumferentially spaced bores or wells 105 which are dimensioned to receive with a slip fit an eccentric cam member 107. The cam 107 is cylindrical and has a threaded bore 109 into which is screwed the stud 84 of the bearing assembly 106. The threaded bore 109 is offset from the center line of the cylindrical cam by a predetermined eccentricity and, as such, when eccentric cam 107 is rotated within the bore 108, the bearing assembly 106 is shifted. When a desired position for the bearing assembly is established, it is locked in place by a set screw 124.

Formed inwardly from the interior surface of the ring gear 100 is a bearing race 114 having opposed side walls 116 and 118. Again, the side walls of the bearing race may include a triangular protuberance, as at 120 and 122, which conform to a V-notch in the bearing assembly resulting when the beveled surfaces of the upper and lower roller bearing members 110 and 112 are juxtaposed. If the bearing assembly of FIG. 6 is used, no such triangular protuberance is required. Because of the eccentric mount, the individual roller bearing assemblies 106 can be adjusted by rotating the eccentric cam 107, using an Allen wrench or the like and then subsequently advancing a threaded lock screw 124 in a threaded, radially extending bore against the eccentric cam to lock the eccentric orientation. As such, the roller bearing assemblies 106 can be adjusted to engage the triangular protuberances 120 and 122 and the walls 116 and 118 of the bearing race 114 with a desired clearance therebetween. It is found that this alternative embodiment also provides the desired stability under load of the ring gear as it is driven in its orbital path. Moreover, this desired result is achieved with a simpler, less expensive implementation compared to the prior art.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An improved bearing and race structure for a clamshell machining lathe used in finishing pipes comprising:

(a) a first, stationary annular member adapted to be concentrically clamped about the periphery of a cylindrical pipe segment to be finished, the first annular member having an inner arcuate face, an outer arcuate face and a planar surface extending therebetween;

(b) a plurality of roller bearings rotatably mounted on individual axles and having a predetermined outer diameter, the roller bearings being affixed to the first annular member with the axles thereof perpendicular to the planar surface of the first annular member to define a generally circular track;

(c) a second, rotatable, one-piece annular member having an inner arcuate face, an outer arcuate face and a planar surface extending therebetween, the outer arcuate face including gear teeth thereon, the planar surface of the second annular member including a circumferential groove having opposed parallel walls defining a bearing race of a depth and width to receive said plurality of roller bearings defining the generally circular track therein when the first and second annular members are juxtaposed with the planar surface of the first annular member in facing relationship to the planar surface of the second annular member, the predetermined outer diameter of the plurality of roller bearings cooperating with the opposed parallel walls defining the circumferential bearing race to rotatably support the second annular member relative to the first annular member.

2. The improvement as in claim 1 wherein the plurality of roller bearings are arranged in first and second sets with the roller bearings in the first set each rotatable about an axis that is radially offset relative to a corresponding axis of the second set.

3. The improvement as in claim 2 wherein a roller bearing in the first set is adjacent to a roller bearing in the second set.

4. The improvement as in claim 3 wherein the roller bearings in the first set engage one of the opposed parallel walls defining the circumferential bearing race and the roller bearings in the second set engage the other of the opposed parallel walls defining the circumferential bearing race.

5. The improvement as in claim 2 wherein the roller bearings include a V-notch in a peripheral surface thereof for cooperating with a V-shaped projection extending outwardly from the opposed parallel walls defining the circumferential bearing race in the second annular member.

6. The improvement as in claim 1 wherein said roller bearings include a V-notch in a peripheral surface thereof for cooperating with a V-shaped projection extending outwardly from the opposed parallel wall defining the circumferential bearing race in the second annular member.

7. The improvement as in claim 6 wherein the roller bearings each comprise a shaft, first and second roller bearing segments, each journaled for rotation on the shaft, the first and second roller bearing segments having a beveled perimeter which together define the V-notch.

8. The improvement as in claim 7 and further including a spacer disposed between the first and second roller bearing segments.

9. The improvement as in claim 1 and further including:

(a) motor means affixed to said first annular member, the motor means including a spur gear for engaging the gear teeth on the second annular member for rotating the second annular member relative to the first annular member about a the plurality of roller bearings.

10. The improvement as in claim 9 and further including a tool block secured to the second annular member for rotation therewith, the tool block including means for advancing a cutting tool in a radial direction in incremental steps upon each revolution of the second annular member.

* * * * *